United States Patent [19]
Brétché

[11] 3,848,388
[45] Nov. 19, 1974

[54] MULTI-DIRECTIONAL CONNECTING ELEMENT FOR PANELS

[76] Inventor: Serge Norbert Emile Brétché, 82 avenue Roger Salengro, Chaville, France 92370

[22] Filed: Feb. 1, 1973

[21] Appl. No.: 328,509

[30] Foreign Application Priority Data
Feb. 8, 1972 France .......................... 72.04186

[52] U.S. Cl. ............... 52/753 D, 52/753 J, 403/362
[51] Int. Cl. ............................................. F16b 5/06
[58] Field of Search .......... 52/753 D, 753 J, 753 W, 52/753 C, 758 D, 758 H, 760; 403/169, 170, 292, 293, 362; 211/177

[56] References Cited
UNITED STATES PATENTS

| | | | |
|---|---|---|---|
| 1,055,713 | 3/1913 | Craig | 52/753 C |
| 1,723,307 | 8/1929 | Sipe | 52/753 J |
| 3,039,232 | 6/1962 | Dunn | 52/753 J X |
| 3,342,457 | 9/1967 | Bobrowski | 403/362 X |
| 3,498,655 | 3/1970 | Arms et al. | 52/760 |
| 3,768,846 | 10/1973 | Hensley et al. | 52/753 D X |

FOREIGN PATENTS OR APPLICATIONS

| | | | |
|---|---|---|---|
| 357,535 | 11/1961 | Switzerland | 52/753 D |
| 323,840 | 10/1957 | Switzerland | 52/760 |
| 1,210,482 | 3/1960 | France | 403/362 |

*Primary Examiner*—Werner H. Schroeder
*Attorney, Agent, or Firm*—Cameron, Kerkam, Sutton, Stowell & Stowell

[57] ABSTRACT

A connecting element for the rapid assembly of panels and especially display panels for exhibition stands is made up of a single piece formed by two or more identical yokes for accommodating the edges of the panels. The bottom of each yoke is joined to the bottom or side of another yoke in order to permit the assembly of panels either in line, at obtuse angles or at right angles. Two packing-strips are inserted into the groove formed in each yoke, are applied against the internal walls of the groove and against the panel to be secured, then locked in position by means of a set-screw which is inclined at an obtuse angle to the axis of the yoke. The wall of each packing-strip has a saw-tooth or like profile in order to prevent slipping with respect to the panel.

5 Claims, 6 Drawing Figures

PATENTED NOV 19 1974　　　　　　　　　　　　3,848,388

MULTI-DIRECTIONAL CONNECTING ELEMENT FOR PANELS

This invention relates to multi-directional connecting elements for assembling panels.

More specifically, the aim of the invention is to provide connecting elements of very simple design which serve to interassemble panels of any material and thus to form structures. There are many circumstances in which it proves necessary to design structures for erection in temporary locations in which they can be both assembled and disassembled very rapidly and with great ease.

A particular example of application is found in exhibition, when it is desired to erect display stands and to employ these panels both for providing insulation between two stands and as advertising media or display surfaces. Since the configuration of the stand must conform to the available space, it is necessary to ensure that these connecting elements permit a very wide variety of arrangements. It is also necessary to ensure that said connecting elements should permit very rapid assembly and disassembly of structures. Moreover, it must be possible to recover the assembly elements in order that these latter may be used again later for the construction of another stand. The connecting elements should have a further useful feature in that they permit the use of panels of any type and any thickness. Finally, these elements must clearly be designed to ensure that the different panels remain interlocked in a highly secure and reliable manner when they have been fixed in position.

Since these structures are also intended to have an attractive appearance, it is desirable to ensure that the elements which serve to interconnect the different panels are as inconspicuous as possible while having a generally pleasing shape.

The precise object of this invention is to provide multi-directional connecting elements for panels which make it possible to satisfy all the conditions set forth in the foregoing.

The connecting element in accordance with the invention is characterized in that it comprises:

a connecting element proper which has the shape of a cylindrical surface limited by two planes at right angles to the generating-lines of said surface, the transverse cross-section of said surface being such as to form grooves surrounded on three sides by faces of said surface, each groove being thus limited by two sides constituted by two parallel ribs and by an end portion constituted by the cylindrical junction surface between said two ribs, at least one of the two sides of each groove being provided with an internally-threaded bore which opens into said groove, the axis of each bore aforesaid being parallel to the plane which limits the cylindrical surface and being such as to form an obtuse angle with the internal face of the corresponding rib, a screw being engaged in each bore, packing-strips, each packing-strip being applied against one of the internal faces of said grooves, that face of each packing-strip which is directed towards the interior of the groove being provided on at least part of its length with means for preventing the panel from sliding with respect to said packing-strips, said means being advantageously constituted by a saw-tooth profile formed on the internal face of said packing-strips.

In a preferred embodiment of the invention, the internal face of the sides of each groove is provided with a recess in the region located near the bottom of said groove and each packing-strip is provided on that portion which is located nearest the bottom of the groove and on the external face thereof with a shouldered end which is capable of engaging in the corresponding recess, the two packing-strips which are inserted in a common groove being joined at the shouldered end aforesaid to a curved spring blade.

The connecting element is therefore constituted by a plurality of yokes (each yoke being made up of two sides and an end portion) which are in rigidly fixed relation and the axes of which are located in the same plane. Packing-strips are inserted into each yoke against the internal faces of this latter and the face which is in contact with the panel to be connected is provided, for example, with a saw-tooth profile. The clamping of said packing-strips against the panel and therefore the rigid coupling of the connecting element with said panels is ensured by means of at least one screw which is inclined at an obtuse angle to the axis of the groove of the yoke. A very secure connection between the panel and the support is therefore obtained by virtue of the saw-toothed shapes of the packing-strips and also by virtue of the inclination of the screw.

A clearer understanding of the invention will in any case be obtained from the following description of a number of embodiments of the invention which are given by way of non-limitative example, reference being made to the accompanying figures in which.

Figure 1:
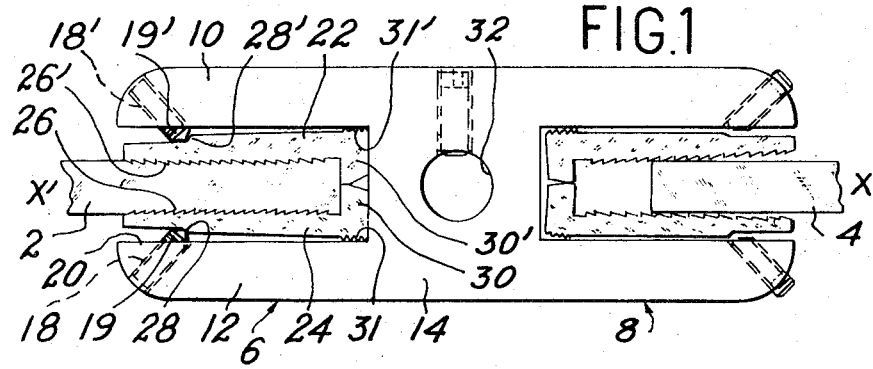
FIG. 1 is a top view showing a simplified embodiment of the connecting element in accordance with the invention.

There is illustrated in the top view of FIG. 1 a connecting element for assembling two panels 2 and 4 which are placed in the line of extension of each other. Throughout the following description, the connecting elements are cylindrical surfaces, the generating-lines of which are located at right angles to the plane of the figure. The connecting element is constituted by two coupled yokes 6 and 8 having the same axis X–X'. Each yoke has two "sides" 10 and 12 each constituted by a rib and a bottom end portion 14. In this particular embodiment, the end portion 14 is clearly common to the two yokes 6 and 8. The ribs 10 and 12 are pierced by an internally-threaded bore 18 and 18', cone-point set-screws 19 and 19' being inserted into said bores. Each bore is parallel to the plane of the figure and is inclined at an obtuse angle to the internal face of the ribs 10 and 12. Packing-strips 22 and 24 which are applied against the internal faces of the ribs 10 and 12 are placed within the interior 20 of the yoke 6, that is to say within the groove. Said packing-strips have saw-tooth profiles 26 and 26'. The screws 19 and 19' lock the packing-strips 22 and 24 in position by virtue of the shoulders 28 and 28' and clamp said packing-strips against the walls of the panel 2. Said panel is thus rigidly coupled with the connecting element. The same description could clearly be made in regard to the yoke 8 which is identical with the yoke 6 in every respect.

In the alternative embodiment shown in FIG. 1, the packing-strips 22 and 24 have heels 30 and 30' which are applied against each other as well as portions 31 and 31' having saw-tooth profiles which are formed on the external faces of said heels and at the bottom of the groove 20. By means of this device, the packing-strips can be clamped even more effectively against the internal faces of the grooves 10 and 12 and against the panel 2.

In an alternative form of construction, the common end portion 14 can have a cylindrical orifice 32, the axis of which is located at right angles to the plane of the figure or in other words parallel to the panels to be assembled. The electric lead-wires for supplying devices which are attached to the panels can accordingly be passed through said orifice.

It is readily apparent that the connecting elements aforesaid have a limited height, with the result that a number of identical connecting elements such as two elements, for example, are employed for the assembly of two panels.

Figure 2:
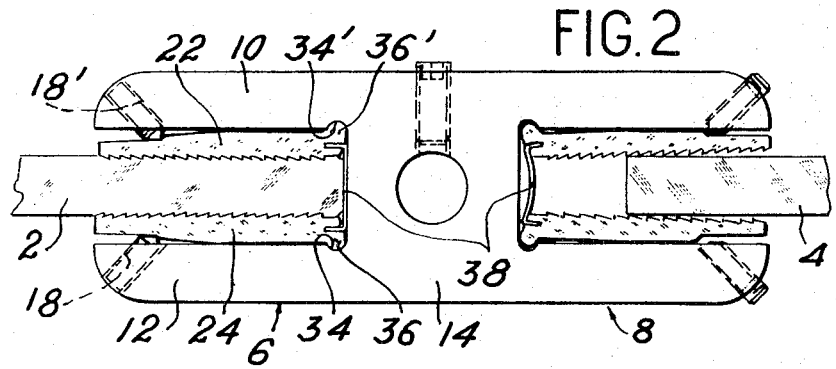
FIG. 2 is a top view of a more elaborate embodiment of the invention

There is shown in FIG. 2 a more elaborate example of construction for two panels. The same references serve to designate the elements which are common to the first two figures. Each groove 20 is provided on the internal faces of the ribs 10 and 12 with recesses 34 and 34' located in proximity to the bottom end portion 14 of the yoke 6. Said recesses 34 and 34' cooperate with end-shoulders 36 and 36' which are formed on the external faces of the packing-strips 22 and 24. The packing-strips are locked in position as in the first example illustrated by means of the screws 19 and 19'. The operation is very simple. The panel 4 which is not yet engaged is shown in the right-hand portion of FIG. 2 (yoke 8). Under the action of the spring blade 38, the packing-strips 22 and 24 are moved towards the bottom of the groove and the end-shoulders 36 and 36' are in a slightly withdrawn position with respect to the recesses 34 and 34'. On the contrary, when the panel is completely engaged (yoke 6), the thickness of the panel is such that the end-shoulders 36 and 36' are inserted into the recesses 34 and 34'. Clamping of the packing-strips 22 and 24 is ensured by means of at least one screw 18.

Highly effective clamping of the panels within the connecting element is thus obtained. In fact, the packing-strips are locked in position with respect to the connecting element by the screw 18 and by the recess 34 which cooperates with the end-shoulder 36; and the connection between the packing-strip and the panel is ensured by means of the saw-tooth profiles 26 and 26' of the packing-strips 22 and 24.

It is readily apparent that the packing-strips 22 and 24 are fabricated in a different manner according to the constituent material selected for the panels to be assembled. For example, if the panels are of glass, the packing-strips 22 and 24 will advantageously be formed of rubber. On the contrary, if the panels are of wood, of agglomerate and the like, the packing-strips are advantageously of metal. The packing-strips can also be made of plastic material.

Moreover, in the examples herein described, the external face of the packing-strip has a saw-tooth profile; but it would not constitute any departure from the scope of the invention if this saw-tooth profile were replaced by striae having another shape which is suited to the nature of the panels, or by a non-slip surface coating such as a granitic coating.

Different forms of connecting elements are illustrated in FIGS. 3 to 6. The packing-strips have been omitted from the figures for the sake of simplification but are identical in shape with those shown in either FIG. 1 or FIG. 2.

Figure 4:
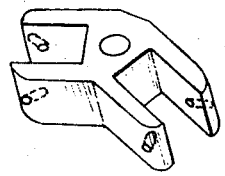
FIG. 4 shows a panel connector which forms an obtuse angle.

FIG. 4 illustrates an example of connecting element in which an obtuse angle is made between the two panels when these latter are joined together.

Figure 3:
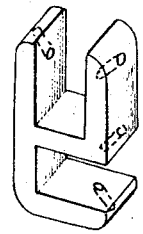
FIG. 3 shows a connector for two panels forming a right angle.

FIG. 3 shows a connecting element for two panels which can be assembled at right angles to each other. It may be noted from this figure that the base of one of the yokes also serve as a side for the other yoke.

Figure 5:
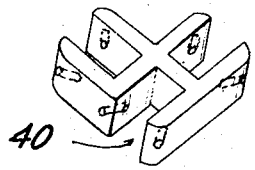
FIG. 5 shows a connector for three panels.

In FIG. 5, there is shown an example of a connecting element for three panels, the third panel being located at right angles to the first two panels. In this case also, one of the sides of one of the yokes (40) serves as a base for the yoke which is located at right angles to the first two yokes.

Figure 6:
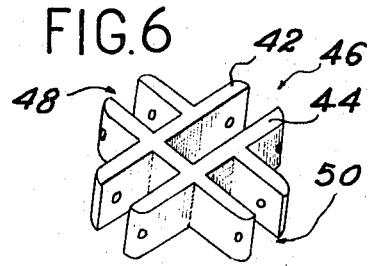
FIG. 6 shows a connector for four panels.

In FIG. 6, there is shown one example of construction of connecting elements for four panels which thus form two partitions at right angles. In this case, the sides 42 and 44 of the groove 46 again serve as bases for the grooves 48 and 50.

It is readily apparent that the different forms of connecting element shown in the figures are not given in any limiting sense. It would not constitute any departure from the invention to assemble the yokes in a different manner.

The connecting elements can advantageously be made of steel. In that case, it is only necessary to cut said connecting elements in sectional members having an adequate cross-sectional area to provide the number of grooves chosen. Said elements can also be fabricated from plastic material by molding.

In the figures, the end portion or "base" of each yoke is a plane located at right angles to the ribs but it will be readily understood that said "base" could be constituted by any cylindrical connecting surface such as a half-cylinder, for example.

This invention is not limited to the examples of construction which have been more especially described with reference to the drawings but extends to all alternative forms.

I claim:

1. A connecting element for panels comprising a connecting element having the shape of a partial cylindrical surface defined by two parallel planes, longitudinal grooves in said surface parallel to said planes surrounded on three sides by faces of said surface, each groove having two sides constituted by two parallel ribs and by an end portion constituted by a junction surface between said two ribs, an internally threaded bore in at least one of the sides of each groove which opens into said groove, the axis of each bore being parallel to the plane which defines the cylindrical surface and forming an obtuse angle with the internal face of the corresponding rib, a screw in each bore, packing-strips in said grooves, each packing-strip engaging one of the internal faces of said grooves, means for preventing sliding motion between said packing-strips and said panel on each of said packing-strips, a recess adjacent the bottom of said groove, a shouldered end for each packing-strip engaging in the corresponding recess and a curved spring blade joining the two packing-strips in a groove at said shouldered ends.

2. A connecting element according to claim 1, said means for preventing sliding motion of the panel with respect to the packing-strips having a saw-tooth profile on the internal face of each packing-strip.

3. A connecting element according to claim 1 the packing-strips being steel.

4. A connecting element according to claim 1, the packing-strips being a material selected from the group consisting of rubber and plastics.

5. A connecting element for panels comprising a connecting element having the shape of a partial cylindrical surface defined by two parallel planes, longitudinal grooves in said surface parallel to said planes surrounded on three sides by faces of said surface, each groove having two sides constituted by two parallel ribs and by an end portion constituted by a junction surface between said two ribs, an internally threaded bore in at least one of the sides of each groove which opens into said groove, the axis of each bore being parallel to the plane which defines the cylindrical surface and forming an obtuse angle with the internal face of the corresponding rib, a screw in each bore, packing-strips in said grooves, each packing-strip engaging one of the internal faces of said grooves, means for preventing sliding motion between said packing-strips and said panel on each of said packing-strips, a toe connected to each of said packing-strips adjacent said end portion of the groove extending inwardly of the groove and abutting the toe of the adjacent one of said packing-strips and toothed means on each of said strips engaging the adjacent side of the groove.

* * * * *